United States Patent
Sager et al.

(10) Patent No.: US 6,468,010 B2
(45) Date of Patent: Oct. 22, 2002

(54) FASTENING ELEMENT

(75) Inventors: Lutz Achim Sager, Scheuring; Astrid Buder, Kaufering, both of (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/829,266

(22) Filed: Apr. 9, 2001

(65) Prior Publication Data

US 2001/0028833 A1 Oct. 11, 2001

(30) Foreign Application Priority Data

Apr. 10, 2000 (DE) .......................... 100 17 750

(51) Int. Cl.$^7$ ................................. F16B 39/02
(52) U.S. Cl. ..................... 411/82; 405/259.5; 411/82.1; 411/82.3
(58) Field of Search .................... 411/82, 82.1, 258, 411/930, 82.3; 405/259.5, 259.6

(56) References Cited

U.S. PATENT DOCUMENTS 4,055,051 A  10/1977  Finney ...................... 175/226
5,328,300 A  7/1994  Fischer et al. ........... 405/259.5
6,393,795 B1 * 5/2002  Irwin et al. ................. 411/82.1

FOREIGN PATENT DOCUMENTS

DE  3304071 A1  8/1984  .................. 411/82
GB  2073283 A  10/1981  .............. 405/259.5

* cited by examiner

Primary Examiner—Lynne H. Browne
Assistant Examiner—Jori Schiffman
(74) Attorney, Agent, or Firm—Sidley Austin Brown & Wood, LLP

(57) ABSTRACT

A fastening element including a cylindrical body (1) having, in its end portion remote from an end facing in a setting direction, a longitudinal bore (22) for receiving a mortar mass, and having, at it end facing in the setting direction, at least one through-opening (5) connecting the longitudinal bore (22) with an outer surface of the body (1), and a mixing device (8) located in the longitudinal bore (22) between the mortar mass and the through-opening (5).

8 Claims, 2 Drawing Sheets

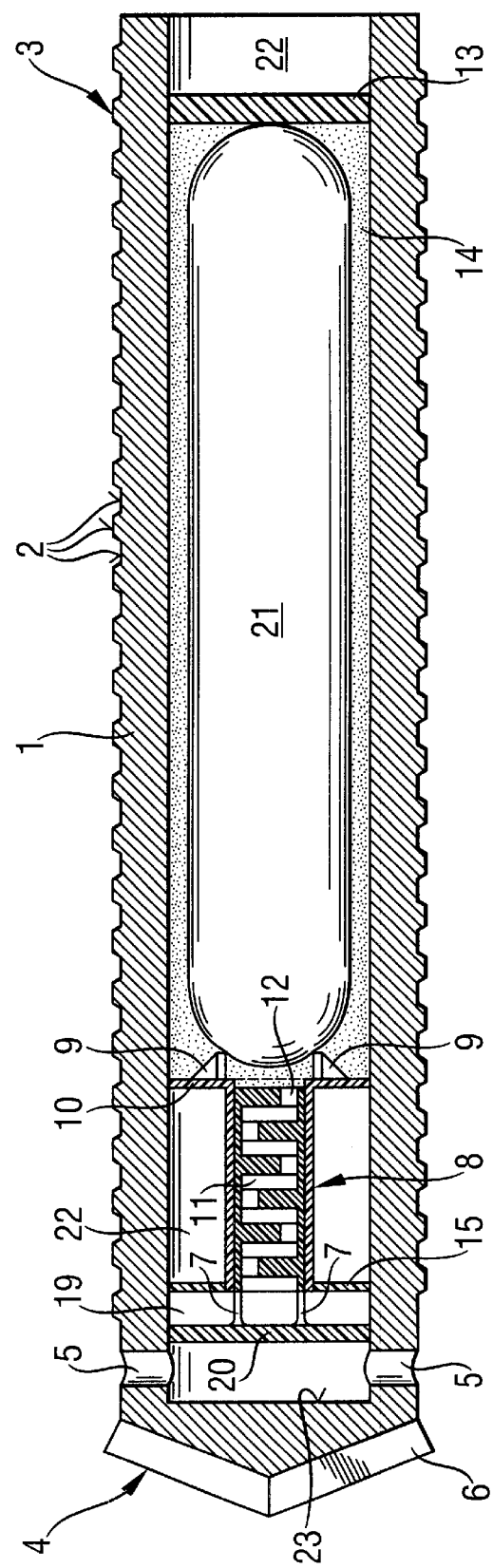

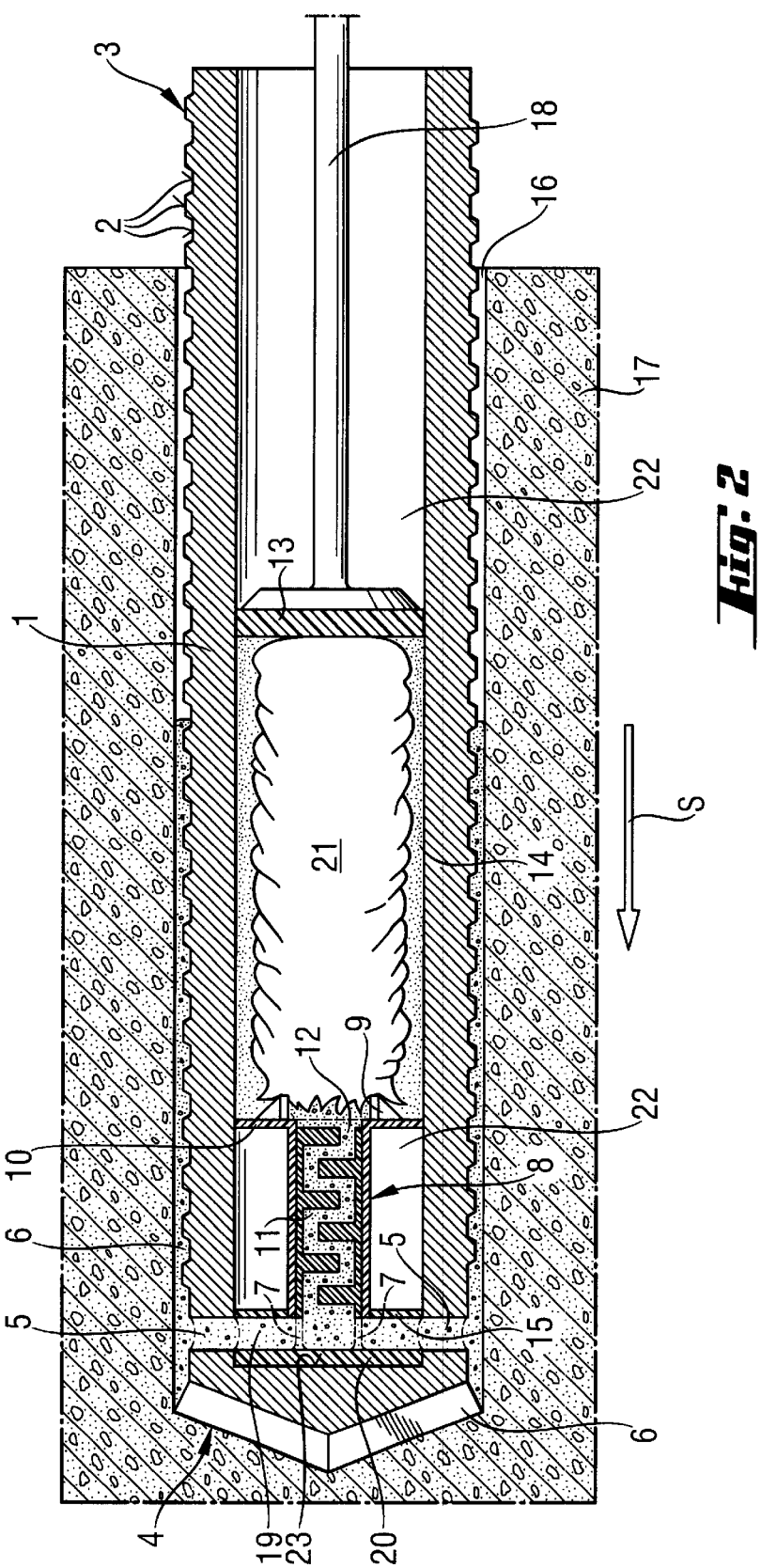

FASTENING ELEMENT

BACKGROUND OF THE INVENTION

1. Field of the Invention

The present invention relates to a fastening element such as, e.g., a roof bolt, used primarily in mine and/or tunnel construction and including a cylindrical body having, in its end portion remote from an end facing in a setting direction, a longitudinal bore for receiving a mortar mass, and having, at its end facing in the setting direction at least one through-opening connecting the longitudinal bore with an outer surface of the body.

2. Description of the Prior Art

Fastening elements of the type described above are generally known. They function primarily for stabilizing walls of hollow spaces such tunnels, galleries and the like. They are used primarily for securing to each other following each other, in a direction transverse to the wall, the wall-forming strata. In many cases, the mechanical characteristics of the layers, which lie in immediate vicinity of the wall surface, in particular, their supporting resistance, changes as a result of formation of a hollow space. Therefore, these layers need be secured to further located, undamaged or unaffected layers or strata.

A fastening element or a roof bolt of the above-described type is disclosed, e.g., in U.S. Pat. No. 4, 055, 051. The U.S. Patent discloses a roof bolt that is formed of a tubular element provided, at one of its end, with a drilling head and, at its other opposite end, with load application means. The interior of the disclosed roof bolt is partially filled with mortar mass. An exit channel extends through the drilling head. The setting process of the disclosed roof bolt is effected in two steps. In the first step, the roof bolt forms, with the use of an available drilling tool, a bore in the constructional component, in particular, in the ground. The drilled-of and commutated stone, which is produced upon drilling with the drilling head of the roof bolt, is removed through outlet openings provided in the drilling head and the space between the bore wall and the outer surface of the fastening element. In a second step, a piston, which is provided at an end of the roof bolt facing in the direction opposite to the setting direction, is advanced in the setting direction, pressing out the mortar mass, which fills the interior of the roof bolt, through the openings provided in the drilling head.

A drawback of the disclosed roof bolt consists in that during the setting process, the mortar mass is first intermixed in the drilling head. With this, the quality of the intermixed mass depends on several factors such as, e.g., the rotational speed of the used drilling tool or constitution of the ground. If a mixing process is effected outside of the roof bolt, then additional tools and operational steps become necessary.

Accordingly, an object of the present invention is to provide a fastening element, such as, e.g., a roof bolt which would insure a good intermixing at any conditions.

SUMMARY OF THE INVENTION

This and other objects of the present invention, which will become apparent hereinafter, are achieved by providing, in the setting direction, end region of the longitudinal bore of the fastening element, a mixing device located between through-opening means which connects the longitudinal bore of the fastening element with the wall of the fastening element, and the mortar mass.

Providing the mixing device inside of the fastening element permits to easily determine the mixing condition. When the mortar mass contacts the ground and the drillings, it is already intermixed. Therefore, even with critical mortar masses, a need in additional mixing device outside of the fastening element is eliminated. Furthermore, the design of the mixing device can be effected at small costs and taking into consideration the requirements the used mortar mass should meet. Placing the mixing device inside the fastening element, in the longitudinal bore, does not require any changes of the outer surface of the fastening element in comparison with the conventional fastening elements. Further, providing the mixing device between the trough-opening means and the mortar mass prevents exit of the non-mixed mortar mass into the bore formed in the constructional component.

Advantageously, the mixing device is located centrically in the longitudinal bore which insures an optimal intermixing of the mortar mass during the extrusion process.

The mixing device advantageously has a mixing channel formed as a static mixer. This proved to be beneficial to a cost-effective solution of the existing problem of achieving good intermixing of the mortar mass under any conditions prevailing outside of the fastening element. A need in the use of a dynamic mixing channel has been eliminated. However, under particular circumstances, a dynamic mixing channel can be used instead of the static channel.

Advantageously, the static channel or mixer is formed as a labyrinth-shaped channel connectable with the through-opening means through which the mortar mass is extruded. This type of the static channel finds particularly an application when one of the components of the mortar mass freely fills the longitudinal bore, without being contained in some enclosure. The labyrinth-shaped channel prevents extrusion of this component out of the fastening element before the start of the setting process. This channel can be closed, e.g., before the start of the setting process, by locking means releasable, e.g., under pressure. The locking means can be formed, e.g., by a pressure-sensitive foil.

Advantageously, the mixing device is located in the longitudinal bore with a possibility of a longitudinal displacement therealong. This insures an easy assembly of the fastening element. In addition, this displacement permits, if needed, to replace the mixing device to accommodate the specific requirement the used mortar mass has to meet.

The mixing device is preferably provided, at its end facing in the setting direction with a sealing piston. Thus, the mixing device includes an element which seals the longitudinal bore, in this case a sealing piston. In the unsetted condition of the fastening element, the sealing piston is located between the through-opening means, which connects the longitudinal bore with the outside of the fastening element, and the mixing device itself, thus closing the mixing channel. During the setting process, the applied pressure displaces the mixing device, together with the sealing piston, in the setting direction until the sealing piston or the mixing device hits a stop. The position of the stop is so selected that when the mixing device is stopped, the sealing piston does not block access to the through-opening means so that the mixing channel becomes operatively connected with the through-opening means, and the mortar mass can be extruded outside of the fastening element.

Advantageously, a collection space, connectable with the through-opening means, is provided between the sealing piston and the mixing device itself. The collection space is formed, e.g., by providing spacer means between the sealing piston and the mixing device and which keeps the sealing piston at a predetermined distance from the mixing device. The collection space is designed for collecting the intermixed mortar mass leaving the mixing channel of the mixing device, which mixing channel is connected with the collection space by an outlet opening. In the unsetted condition of the fastening element, the collection space is separated from the through-opening means by the sealing piston. During the setting process, the collection space becomes connected with the through-opening means, e.g., with the through-opening means becoming contiguous with the collection space. Naturally, the sealing piston itself can be provided with connection channels communicating with the through-opening means.

The mixing device is provided, at its end facing in a direction opposite the setting direction, with piercing means. This permits to pack the mortar mass for use with the fastening element in a bag. The piercing means can include a blade-like piercing element. Preferably, the piercing means should include sufficiently sharp element(s) for piercing the mortar mass-surrounding enclosure to provide for squeezing the mortar mass out of its enclosure.

Preferably, the cross-section of the mixing channel is smaller than the cross-section of the longitudinal bore in order to provide for an increased flow speed of the mortar mass through the mixing channel. This provides for better intermixing of the mortar mass.

Advantageously, the mixing device is formed of a mortar mass-resistant plastic material. Instead of a plastic material, other mortar mass-resistant materials can be used for forming the mixing device. In addition, the wall of the longitudinal bore which can, e.g., be made of metal, can have a plastic material coating for protecting the wall from the mortar mass or its component. Alternatively, a sleeve formed of a plastic material can be inserted in the longitudinal bore.

The novel features of the present invention, which are considered as characteristic for the invention, are set forth in the appended claims. The invention itself, however, both as to its construction its mode of operation, together with additional advantages and objects thereof, with be best understood from the following detailed description of preferred embodiments, when read with reference to the accompanying drawings.

BRIEF DESCRIPTION OF THE DRAWINGS:

The drawings show:

FIG. 1. a longitudinal cross-section view of a fastening element according to the present invention; and FIG. 2. a longitudinal cross-section view of the fastening element shown in FIG. 1 during the setting process.

DETAILED DESCRIPTION OF THE PREFERRED EMBODIMENT

A fastening element according to the present invention, which is shown in FIGS. 1–2, has a cylindrical body 1 having a longitudinal bore 22 in which a multicomponent mortar mass is received. The body 1 has, at its end facing in the setting direction, a drilling head 4 and, at its opposite end, an outer profile 2 that forms load application means 3.

The body 1, which can, e.g., be formed of metal, has, at its, facing in the setting direction, end, one or more through-openings 5 uniformly distributed over its circumference. In the embodiment shown in the drawings, the shaped outer profile 2 extend over the entire length of the body 1. The shaped outer profile 2 can be formed, e.g., by rolling. In the bore 22 of the body 1, between the through-openings 5 and the mortar mass, there is provided a mixing device 8.

The drilling head 4 has a conical tip provided with abrasive elements 6, in particular, with hard metal elements. To provide for removal of the drilling dust, the outer diameter of the drilling head 4 is formed larger than the diameter of the body 1.

The mortar mass, which is received in the longitudinal bore 22, is arranged between a pressing-out piston 13 and the mixing device 8. In the embodiment shown in the drawings, a hardener 14, which forms one of the components of the mortar mass, simply fills the bore 22, without any additional receiving means being provided therefor. Other components of the mortar mass can be, e.g., packed in one or more hose-like bags 21. It is very important that both the pressing-out piston 13 and the mixing device 8 sealingly retain the mortar mass in the bore 22 of the body 1.

The mixing device 8 has a mixing channel formed as a static mixer 11. The static mixer 11 is retained in at the opposite ends of the channel with flanges 10 and 15. A sealing piston 20 adjoins the mixing channel at its end facing in the setting direction. The sealing piston 20 is provided with one or more spacers 7 which provide for forming a collection space 19. The flange 10, which closes the end of the mixing channel facing in a direction opposite to the setting direction, is provided with piercing elements 9 that can be brought in contact with the bag 21 for piercing the same during the setting process which enables the mortar mass, which fills the bag 21, to be pressed out.

During the setting process, which is shown in FIG. 2, the fastening element is subject, by a drilling tool (not shown) to rotational and translateral movement. The drilling head 4 drills a cylindrical bore 16 in the constructional component for receiving the body 1. As soon as the setting depth is reached, the pressing-out piston 13 is subjected to the action of the pressing means 18 that applies pressure to the piston 13 acting in the setting direction S. The bag 21 is pressed against the piercing elements 9 and is pierced thereby. The mortar mass components contained in the bag 21 enter the mixing device 8 through the opening 12. The intermixed mortar mass, which fills the collection space 19, applies pressure to the sealing piston 20. The piston 20 is displaced in the setting direction S, together with the mixing device 8, until the piston 20 is received in recess 23, freeing the through-openings 5. The separate components of the mortar mass are intermixed by the mixing device 8 and enter the bore 16 through the through-openings 5. The mortar mass is subjected to the action of the piston 13 until it fills the space between the wall of the bore 16 and the outer surface of the body 1. Conventionally the amount of the mortar mass is so selected that it almost completely fills the space between the wall of the bore formed in a constructional component and the outer surface of the portion of the body 1 received in the bore. However, the mortar mass can also not fill entirely this space.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A fastening element, comprising a cylindrical body (1) having, in an end portion thereof remote from an end facing in a setting direction, a longitudinal bore (22) for receiving a mortar mass, and having, at the end thereof facing in the setting direction, at least one through-opening (5) connecting the longitudinal bore (22) with an outer surface of the body (1); and a mixing device (8) located in the longitudinal bore (22) between the mortar mass and at least one through-opening (5);

wherein the mixing device (8) is longitudinally displaceable in the longitudinal bore (22).

2. A fastening element according to claim 1, wherein the mixing device (8) is located substantially centrically in the longitudinal bore (22).

3. A fastening element according to claim 1, wherein the mixing device (8) has a mixing channel formed as a static mixer (11).

4. A fastening element according to claim 2, wherein the mixing device (8) has labyrinth-shaped channel connectable with the through-opening (5).

5. A fastening element according to claim 2, wherein the mixing device (8) has a mixing channel a cross-section of which smaller than a cross-section of the longitudinal bore (22).

6. A fastening element according to claim 1, wherein the mixing device (8) is provided, at an end thereof facing in a direction opposite to the setting direction, with piercing means (9).

7. A fastening element according to claim 1, wherein the mixing device (8) is formed of a plastic material.

8. A fastening element, comprising a cylindrical body (1) having, in an end portion thereof remote from an end facing in a setting direction, a longitudinal bore (22) for receiving a mortar mass, and having, at the end thereof facing in the setting direction, at least one through-opening (5) connecting the longitudinal bore (22) with an outer surface of the body (1); and a mixing device (8) located in longitudinal bore (22) between the mortar mass and at least one through-opening (5);

wherein the mixing device (8) is provided, at an end thereof facing in the setting direction, with a piston (20) for sealing the longitudinal bore (22); and wherein the mixing device (8) and the sealing piston (20) form a collection space (19) therebetween connectable with the through-opening (5).

* * * * *